United States Patent [19]

Coplan et al.

[11] Patent Number: 4,467,001
[45] Date of Patent: Aug. 21, 1984

[54] PROCESS AND DEVICE FOR APPLYING, DRYING AND CURING A COATING ON FILAMENTS

[75] Inventors: Myron J. Coplan, Natick; Robert D. Burchesky, Dedham, both of Mass.

[73] Assignee: Albany International Corp., Albany, N.Y.

[21] Appl. No.: 453,164

[22] Filed: Dec. 27, 1982

[51] Int. Cl.³ .......................... B05D 1/18; B05C 3/12
[52] U.S. Cl. ............................... 427/434.6; 427/177; 68/175; 118/67; 118/420; 118/DIG. 19
[58] Field of Search ........... 118/420, 67, 68, DIG. 18, 118/DIG. 19, 125, 405; 68/181 R, 175; 242/157 R; 427/434.6, 177, 178, 378, 379, 434.7

[56] References Cited

U.S. PATENT DOCUMENTS

| | | | |
|---|---|---|---|
| 3,313,646 | 4/1967 | Zalinge | 118/67 |
| 4,252,583 | 2/1981 | Garner | 156/48 |
| 4,352,277 | 10/1982 | Sando et al. | 68/175 |

Primary Examiner—Michael R. Lusignan
Assistant Examiner—K. E. Jaconetty
Attorney, Agent, or Firm—Kane, Dalsimer, Kane, Sullivan and Kurucz

[57] ABSTRACT

Apparatus and a process for coating continuous lengths of filaments are described. The apparatus includes a tubular vessel for applying a fluid coating to a plurality of traveling filaments which are then separated and passed through drying and curing zones in separate and appropriate ovens. The method of the invention, carried out in the apparatus of the invention, is particularly useful to apply special coatings to continuous lengths of hollow fibers to prepare composite hollow fibers useful as separatory membranes.

5 Claims, 6 Drawing Figures

PROCESS AND DEVICE FOR APPLYING, DRYING AND CURING A COATING ON FILAMENTS

BACKGROUND OF THE INVENTION

1. Field of the Invention

The invention relates to the application, drying and curing of coatings on continuous filaments and more particularly relates to improved apparatus and methods for doing so.

2. Brief Description of the Prior Art

Coatings on continuous filaments to alter or improve the physical and chemical properties of the uncoated filament are commonly utilized in industry. A typical process for coating continuous filaments might consist of a large open tank with submerged driven rolls to advance the filaments through the coating solution. Such a system may suffer many disadvantages, for example, large volumes of coating solution are necessary to completely submerge the driven rolls; uniform temperature control of the coating solution may be difficult to maintain; and reactive coating solutions may require larger make-up flows or frequent replacement. Also, operation at elevated temperatures may cause problems with hazardous vapor control and undesirable film formation at the bath surface. Additional problems may occur if the coating solution is corrosive in nature and attacks some of the mechanical components of the submerged drive rolls such as bearings and seals. These deficiencies, among others, of conventional coating apparatus and processes are a disadvantage to the efficient, controlled, continuous coating of monofilament or multi-filament substrates.

The drying and curing of coatings applied to the surfaces of filaments also raises technical difficulties. For example, controlling the temperature, the uniform and complete removal of solvent and the uniform curing of the coating can be difficult and complex.

This invention presents new apparatus and a method for efficient and controlled application of a coating solution onto continuous filaments, and for controlling the environment surrounding the coated filament as the coating dries and cures. The apparatus and the method of the invention are particularly useful for coating continuous hollow fiber filaments to be employed as separating membranes. The hollow fiber substrates, preliminary to coating, are generally saturated with water, solvent materials, non-solvent liquids and like materials which may interfere with or complicate the application, drying and curing of special coatings required to form a composite separatory membrane of the hollow fiber filaments. In the method of the invention, the inherently present fluids are removed and replaced with specific coatings on the filament surfaces.

SUMMARY OF THE INVENTION

The invention comprises apparatus for the coating, drying and curing of continuous lengths of multiple filaments, which comprises;

a tubular vessel having a first end for receiving the multiple filaments, a second end for discharging the multiple filaments, a tubular body joining the first and second ends, and a coating chamber defined interiorly of the ends and the body, said body having a "U" shape, said ends individually having a funnel shape and together forming the top of the "U";

means in the second end of the tubular vessel for separating the multiple filaments discharged from said second end;

a drying oven disposed vertically over the second end of the tubular vessel, said oven comprising an enclosure defining an interior drying chamber for drying, an opening in a lower portion of the enclosure into said drying chamber for receiving separated multiple filaments from the second end of the tubular vessel into the drying chamber and an opening in an upper portion of the enclosure out of the drying chamber for passage of the separated multiple filaments out of the drying oven;

means for moving heated drying fluid through the drying chamber and out of the upper opening;

a curing oven disposed vertically above the upper opening of the drying oven and spaced apart from said drying oven, said curing oven comprising a housing defining an interior curing chamber, said housing having an upper end, a lower end, an aperture in the lower end for receiving the separated and dried filaments from the drying oven into the curing chamber and an aperture in the upper end for passing the separated and dried filaments out of the curing chamber;

means for moving heated fluid through the curing chamber and out of the lower aperture;

means for collecting heated fluids and any entrained materials from the upper opening of the drying oven enclosure and the lower aperture of the curing oven housing;

means for the take-up of separated, dried and cured coated multiple filaments passed out of the aperture in the upper end of the housing for the curing oven; and means for conveying the multiple filaments through the coating chamber, drying chamber, curing chamber to the means for take-up, in a continuous pass.

The term "continuous length" as used herein means a length of at least equal to the distance in the pathway described above, between the first end of the tubular vessel and the take-up means.

The invention also comprises the method of applying a coating to a continuous length of filament, drying it and curing the coating employing the apparatus of the invention.

DETAILED DESCRIPTION OF THE PREFERRED EMBODIMENTS OF THE INVENTION

Figure 1:
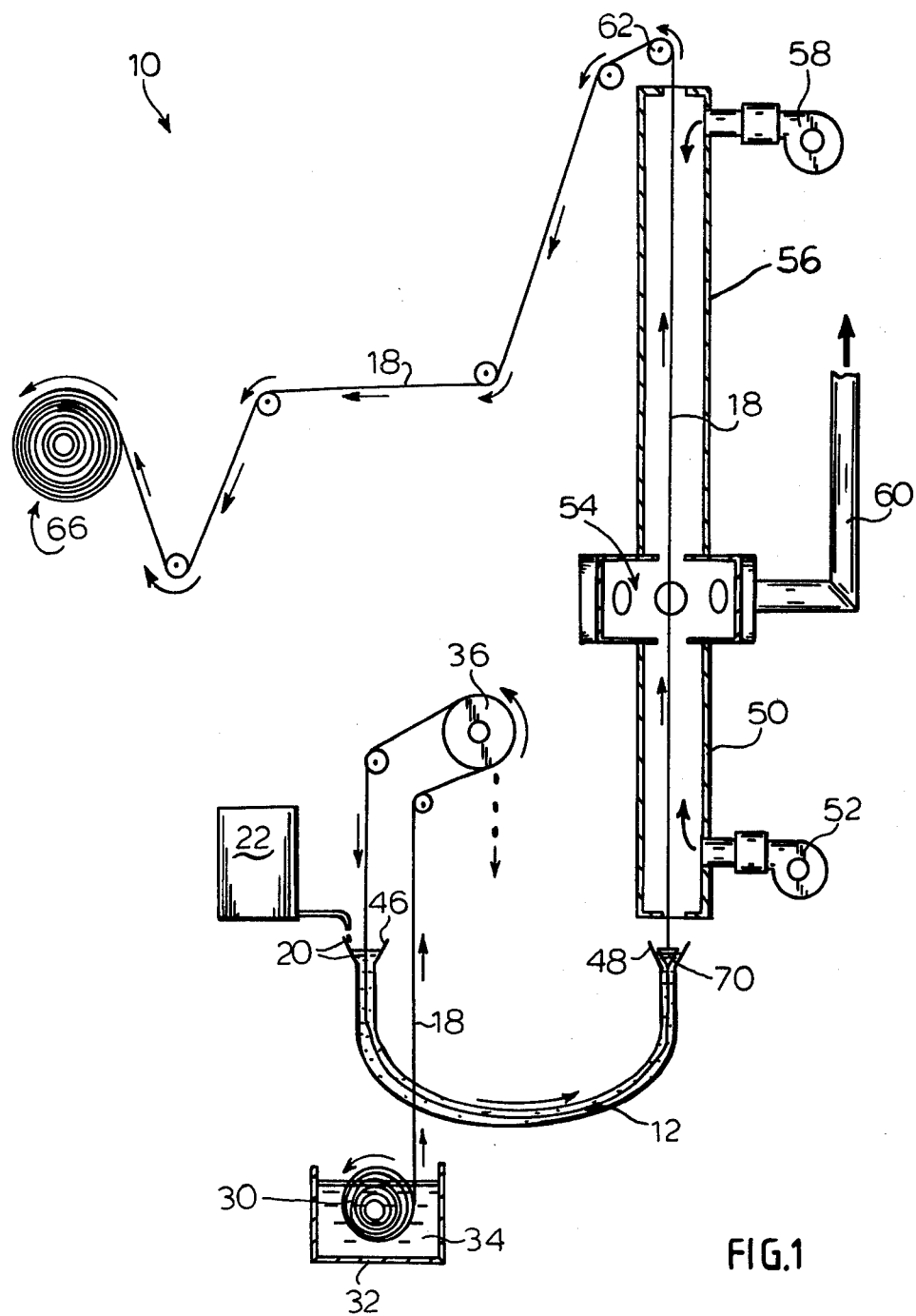
FIG. 1 is a schematic drawing of preferred embodiment apparatus of the invention.

The FIG. 1 is a schematic representation of a preferred embodiment apparatus 10 of the invention. The apparatus 10 of the invention includes a jacketed coating vessel in the form of a tube 12 with an entrance funnel 46. A bundle of filaments 18 are inserted into one end of the "U"-shaped tube 12 which contains a coating solution 20. Solution 20 fills tube 12 from a source 22. For the sake of simplicity, the bundle of separate filaments 18 is shown in the FIG. 1 as a single element 18. The use of a tube vessel such as tube 12 to contain the coating solution 20 is advantageous in that it minimizes the volume of coating solution required for coating. The preferred material for construction of the coating tube 12 is Teflon TM because of its very low coefficient of friction. Other materials may also be used for fabricating the coating tube 12 provided that the friction between the tube 12 and the filaments 18 being pulled through the tube, is low enough. The maximum tolerated friction should not allow serious abrasion to occur to the filaments 18 or the coating tube 12 and needs to be low enough that the filament 18 breaking strength is not exceeded. Selection of materials is therefore dependent on the type of filament, the size and number of filaments, the length of the tube 12, the radius of curvature of the tube 12 and the nature of the coating solution 20. The coating solution 20 also has an important influence on the overall friction in the system. The coating solution 20 can act as a lubricant to reduce friction between the filaments 18 and the coating tube 12 and to prevent damage caused by abrasion. The viscosity of the coating solution 20 will affect the tension required to pull the filaments 18 through the tube 12. High coating solution viscosity will increase the frictional drag on the filaments 18 when the coating solution 20 flow velocity is much slower than the linear velocity of the filaments 18. This frictional drag will be even greater when the coating solution 20 is flowing counter-current to the filament 18 path. High coating solution viscosity may be used to advantage when it is pumped concurrently with the filaments 18 moving at approximately the same linear speed or even faster. When pumped at a faster speed, the coating solution 20 may actually be used to drive the filaments 18 through the coating tube 12.

Figure 2:
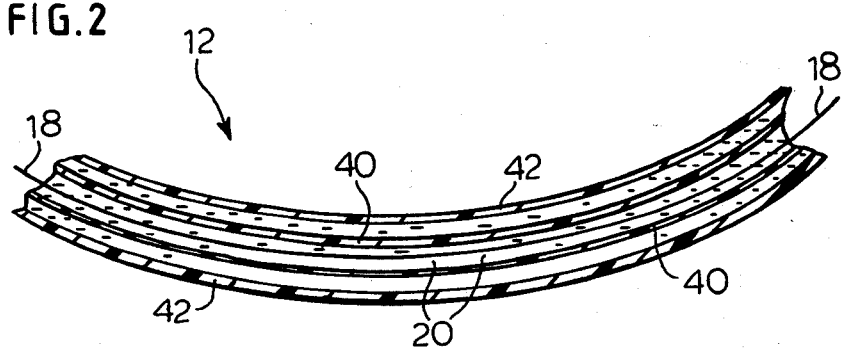
FIG. 2 is an enlarged, cross-sectional view of a portion of the tubular coating vessel shown in FIG. 1.

Referring to FIG. 2, an enlarged cross-sectional view of the coating vessel or tube 12, one can see that the coating tube 12 comprises an inner tube 40 located inside of a larger tube 42 which functions as a jacket. The jacket tube 42 is connected to a source of thermostatically controlled heating or cooling fluid. This fluid is circulated through the jacket tube 42 and maintains the desired temperature of the coating solution 20 in tube 40. The jacketed tube system of tube 12 is curved into a U-shaped position that allows the double open ended coating inner tube 40 to be filled with the coating solution 20, i.e.; the ends of the coating tube 12 are positioned upward so as to be at the top of the "U". Returning to FIG. 1, one can see that a funnel 46, 48 is formed in each end of the coating tube 12. Funnel 46 is a guide for inserting filaments 18 and solution 20 into the coating tube 12.

Figure 3:
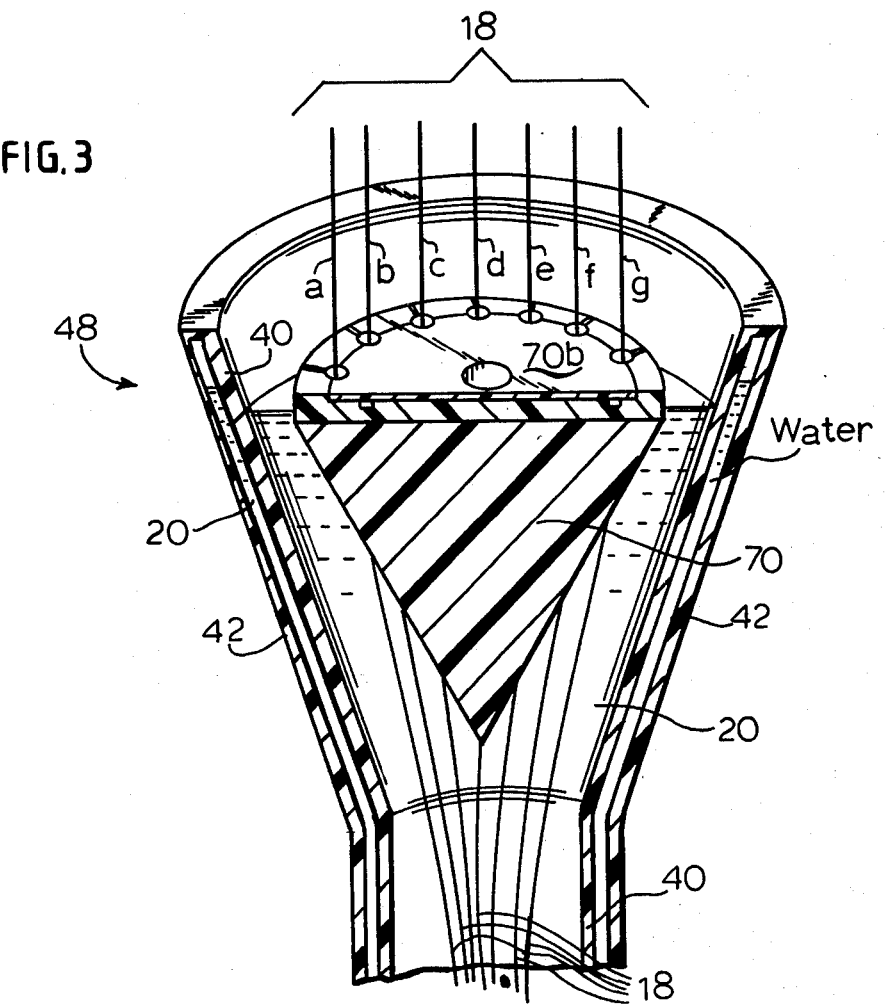
FIG. 3 is an enlarged, cross-sectional view of the discharge end of the tubular coating vessel shown in FIG. 1.

The filaments 18 to be coated are fed into the funnel 46 of coating tube 12 (inlet) and pulled out of funnel 48 at the other end (exit). The funnel 46 at the inlet is useful for directing the introduction of large numbers of filaments 18 and the coating solution 20 into the coating tube 12. The funnel 48 at the exit has several features best seen in FIG. 3, an enlarged cross-sectional side view. Funnel 48 may be constructed out of glass in order to give visual access to the separation device 70 that it contains. The funnel 48 also has a double wall as in the tube 12, of which it is an extension forming a jacket that may be used to control the temperature of the coating solution 20 contained in the funnel 48. The exit funnel 48 may also contain a port (not shown in FIG. 3) that allows the coating solution 20 to overflow out through the double walls of the funnel 48 jacket. The filament 18 separation device 70 is mounted within funnel 48 and comprises an inverted cone body 70 and a removable cover 70b upon the exposed, upper part of the cone (the base).

Figure 4:
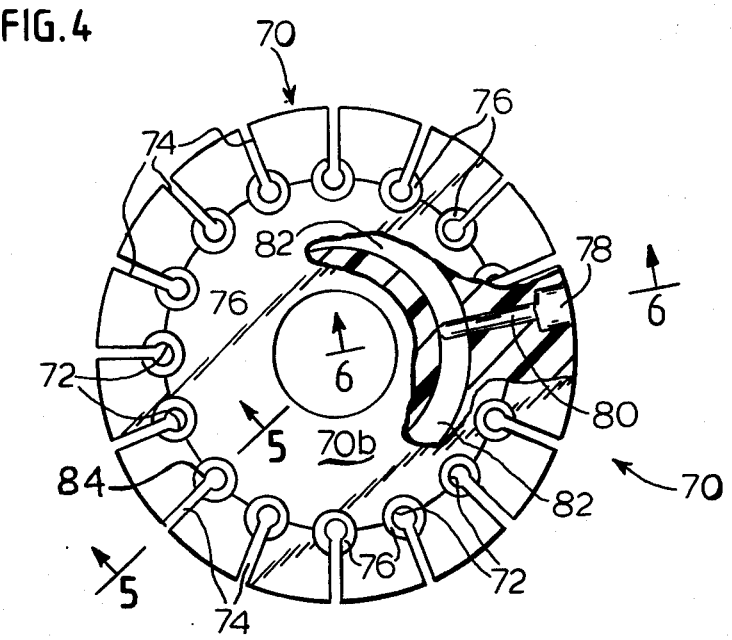
FIG. 4 is a top view of the filament separating component shown in FIG. 3.
Figure 5:
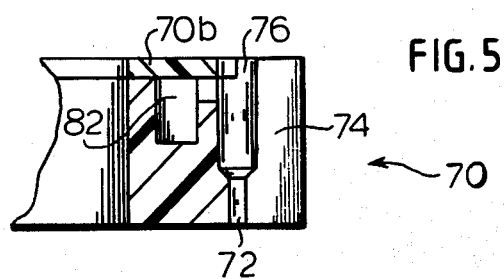
FIG. 5 is a view along lines 5—5 of FIG. 4.
Figure 6:
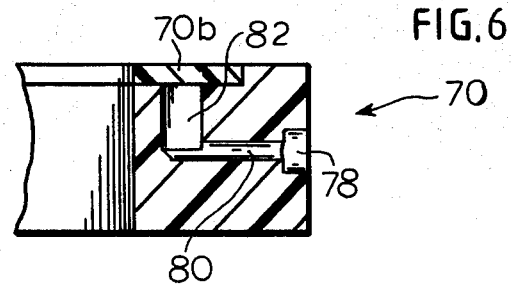
FIG. 6 is a view along lines 6—6 of FIG. 4.

The FIGS. 5 and 6 are views along lines 5—5 and 6—6, respectively, of FIG. 4 and show further details of the construction of device 70. In operation, the group of individual filaments 18 (a)-(g) enter the center of the funnel 48 from the coating tube 12 and then are separated from each other by being drawn through individual holes 72 via slots 74 in the separation device 70. These "slots" 74 are cut in from the outer edge of device 70 on a plane which is perpendicular to the top horizontal edge of the funnel 48. The spacing of slots 74 around the periphery of device 70 is such that filaments 18 cannot touch each other. Each slot 74 connects to a circular guide hole 72. The diameter of the guide hole 72 must be only slightly larger than the filament 18 diameter that will pass through it. The upper half 76 of the drilled guide hole 72 is oversized to a diameter that will not allow filament 18 contact with the edge of the wider opening 76. The angle the filament 18 must travel as it leaves the separator device 70 will determine to some degree the size of the opening 76. This oversized opening 76 above each guide hole 72 forms a coating bath reservoir that ensures that the coating liquid 20 is the last contact the filament 18 makes before leaving tube 12. The level of the coating bath is maintained by the use of an overflow drain 78. Each opening 76 is connected by a channel 80 to a drain manifold 82. A tube may connect this manifold with the previously described port that passes through the double walls of the funnel 48 jacket (not shown in the figures). The overflowed liquid can be either discarded or reused depending upon the specific application. The separation device 70 has a removable cover 70b that minimizes evaporation losses at the separation device 70 and exit funnel 48. The cover 70b lays over the slots 74, the drain channels 80 and the manifold 82. The only exposed surface of coating solution 20 is the surface directly above the oversized opening 76. The thickness of the cover 70b forms an air well that helps to minimize air flow over the bath reservoir and therefore again minimizes evaporation. Evaporation minimization not only controls the solids level of the coating solution 20, but also the actual temperature at the surface of the coating solution 20. The cover 70b includes the holes 84 which are in alignment with openings 76 and allow passage of the filaments 18.

Returning again to FIG. 1, it will be seen that in the embodiment apparatus 10, the filaments 18, after passing through a solution 20 of coating compound, are passed in separate strands to a dryer oven 50 where they are dried in one zone at a controlled temperature and thereafter pass into another zone for the curing of the coating compound in cure oven 56 at another temperature. The forced convection drying air is introduced at the bottom of vertical oven 50 by first stage heater 52 and moves upward co-currently with the filaments 18 during the drying. The solvent laden air leaves the oven 50 at the gap 54 between the two ovens 50, 56. The filaments 18 continue upward into the vertical curing oven 56. The air in the curing oven moves downward or counter-currently with respect to the upward moving filaments 18. The higher temperature curing air from second stage heater 58 also leaves the system at the gap 54 between the two ovens 50, 56. The combined exhaust gases from the drying stage and the curing stage are removed by an uncoupled exhaust system 60. The air flow in either of the two ovens 50, 56 is unaffected by variations in the exhaust system 60 flow since the exhaust system is not directly coupled to the drying and curing ovens 50, 56 but effectively removes air discharged from the ovens 50, 56 into the intervening gap 54.

Removing the solvent laden air before it reaches the curing zone in oven 56 has the advantage of preventing very high temperature solvent vapor from plasticizing the substrate filament 18 or the applied coating. The counter-current air flow in the curing zone of oven 56 further ensures that there is no accumulation of solvent in the coated filament.

The location of the two air injectors (heaters 52, 58) close to the supported zones of the filaments 18 path, such as on roller 62 through the ovens 50, 56 is important. The turbulence of the injected drying or curing air can severely shake the filaments if it occurs somewhere in the middle of the unsupported span of the traveling filaments 18. Severe shaking of filaments 18 can cause them to touch each other while still in a tacky, uncured state. This can cause the filaments 18 to become glued together, or form defects in the coating. After passage through the curing oven 56, the filaments 18 may be taken-up on a take-up winder 66 for storage before ultimate use.

From a reading of the above-described preferred embodiments of the invention, those skilled in the art will appreciate that many variations of the apparatus are possible without departing from the spirit and the scope of the invention. Specific materials of construction and use, dimensions of components, roller or like conveyor systems for moving the filaments from point to point and like considerations will be dependent on the physical character and the nature of the specific filaments and coatings employed. These selections should of course be made on the basis of sound engineering practice. Optimum conditions of temperature, drying times, curing times and the like may be determined for given applications by trial and error techniques.

What is claimed:

1. Apparatus for the coating, drying and curing of continuous lengths of multiple filaments, which comprises;

a tubular vessel having a first end for receiving the multiple filaments, a second end for discharging the multiple filaments, a tubular body joining the first and second ends, and a coating chamber defined interiorly of the ends and the body, said body having a "U" shape, said ends individually having a funnel shape and together forming the top of the "U";

means in the second end of the tubular vessel for separating the multiple filaments discharged from said second end;

a drying oven disposed vertically over the second end of the tubular vessel, said oven comprising an enclosure defining an interior drying chamber for drying, an opening in a lower portion of the enclosure into said drying chamber for receiving separated multiple filaments from the second end of the tubular vessel into the drying chamber and an opening in an upper portion of the enclosure out of the drying chamber for passage of the separated multiple filaments out of the drying oven;

means for moving heated drying fluid through the drying chamber and out of the upper opening;

a curing oven disposed vertically above the upper opening of the drying oven and spaced apart from said drying oven, said curing oven comprising a housing defining an interior curing chamber, said housing having an upper end, a lower end, an aperture in the lower end for receiving the separated and dried filaments from the drying oven into the curing chamber and an aperture in the upper end for passing the separated and dried filaments out of the curing chamber;

means for moving heated fluid through the curing chamber and out of the lower aperture;

means for collecting heated fluids and any entrained materials from the upper opening of the drying oven enclosure and the lower aperture of the curing oven housing;

means for the take-up of separated, dried and cured coated multiple filaments passed out of the aperture in the upper end of the housing for the curing oven; and means for conveying the multiple filaments through the coating chamber, drying chamber, curing chamber to the means for take-up, in a continuous pass.

2. The apparatus of claim 1 wherein the means for separating the multiple filaments comprises;

a body having the shape of an inverted cone, the top of which is the base of the cone;

said top presenting a circular, planar surface;

said surface bearing a plurality of openings spaced about the periphery of the circle;

said openings providing passages between the top and the sidewall of the cone, in alignment with the axis of the cone;

a main channel in the top surface, located inwardly of the holes and connected to each of said holes by a plurality of smaller side channels which connect with said holes at points intermediate between the top and the sidewall; and cover means to cover said main channel.

3. The apparatus of claim 2 wherein said passages are open between the top and the sidewall by a slot opening to the outer surface of the cone.

4. The apparatus of claim 3 wherein an overflow port drains the main channel.

5. A method of applying a coating to continuous lengths of filaments, which comprises;

providing a tubular vessel having a first end for receiving the multiple filaments, a second end for discharging the multiple filaments, a tubular body joining the first and second ends, and a coating chamber defined interiorly of the ends and the body, said body having a "U" shape, said ends individually having a funnel shape and together forming the top of the "U";

carrying the filaments continuously through said vessel from the first to the second end, whereby they are coated;

separating individual filaments from each other as they pass from the second end of said vessel;

continuously carrying the coated and separated filaments through a means for drying the coating;

continuously carrying the dried filaments through a means for curing the coating; and taking up the coated, dried and cured filaments.

* * * * *